Patented July 14, 1942

2,289,672

UNITED STATES PATENT OFFICE 2,289,672

COMPOUNDING RUBBER

James A. Merrill, Akron, Ohio, assignor to Wingfoot Corporation, Wilmington, Del., a corporation of Delaware No Drawing. Application March 31, 1938,
Serial No. 199,186

4 Claims. (Cl. 260—821)

This invention relates to a method of compounding rubber. More particularly, it relates to a method of preparing rubber crumb or powder containing carbon black.

Many methods of preparing powdered or granulated rubber are known. It has been suggested that one of the principal advantages of the use of rubber in such form is that compounding ingredients may readily be incorporated into such finely divided rubber with a saving in time and energy while securing certain incidental advantages. However, when powdered rubber is prepared according to well known processes in the prior art while incorporating into the powdered rubber finely divided carbon black as a pigment and reinforcing agent, certain inherent difficulties are encountered. It is one object of the present invention to eliminate certain of these difficulties while obtaining a product having superior physical properties and lending itself admirably to use in the production of various rubber articles.

The ordinary and obvious method of compounding latex with pigments to produce a compounded powdered or crumb rubber by the chemical flocculation method is to disperse the pigments or compounding ingredients with a minimum amount of the proper dispersing agents, add this dispersion to the latex, flocculate the rubber, and reduce it to powder form. However, when carbon black dispersed in water is added to the latex and this compounded latex is flocculated and filtered, the resulting cake is composed of rubber particles which are so coherent that the cake cannot readily be crumbled or ground due to its rubbery nature. This is particularly true when large amounts of carbon black are added to the latex, as in the preparation of a rubber compound for use in tire treads, in which case it is customary to add about 50 parts of carbon black per 100 of rubber. By the use of certain of the prior art processes, it is possible to prepare a powdered rubber containing carbon black, this result usually being obtained by the use of substantial quantities of added hydrophilic colloid, the exact amount required depending upon the particular colloid employed and the amount of carbon black to be incorporated. These added colloidal materials are of various kinds, some of them on subsequent treatment yielding by metathesis solid compounding ingredients while others are solubilized protein materials, etc. Even in these cases, however, the use of the present invention is advantageous, yielding filter cakes of flocculated rubber which are much more readily crumbled and handled than those obtained without the use of the invention. Moreover, while the addition of these hydrophilic materials may be useful for some purposes, there are certain applications in which their use is undesirable and it is preferable to have the rubber in its intermediate or final form free from their presence. For example, their presence causes the rubber to be more water sensitive and they often adversely affect the abrasion resistance of tread stocks. The present invention makes it possible to reduce the amount of the hydrophilic colloids or to eliminate them entirely while still obtaining the rubber in desired powdered form. It is, therefore, another object of the present invention to produce rubber powder containing carbon black but free from these added hydrophilic colloids, which powder is non-coherent and can be readily handled in further mixing and processing operations.

In accordance with the principles of the present invention, it has been found that if, instead of adding the carbon black to the latex before the latter is flocculated, the same, suitably dispersed, be added to the latex slurry after flocculation of the rubber particles but before filtration or dewatering, a crumbly cake is formed on subsequent separation of the compounded rubber particles, which cake can be easily ground to small particle size to yield a non-coherent rubber powder. Moreover, when the dried powder so formed is consolidated and worked on a mill or other mixing device, the dispersion of the carbon black in the rubber is as good as can be obtained by any other known means of compounding. Moreover, in the normal practice of the invention, on the addition of the dispersion of carbon black to the flocculated latex slurry, there occurs a limited aggregation of the carbon black particles and an adherence of these particles to the rubber flocs so that, on subsequent filtration, there is no substantial loss of carbon black and the proportions of rubber and carbon black are easily determined and controlled. On subsequent consolidation and working of the compounded rubber these aggregates of carbon black readily break down and disperse in the rubber without undue expenditure of energy to yield a product in which the pigment dispersion is excellent.

In the following examples, there is illustrated the difference in the results obtained when the carbon black is added to the latex before flocculation and when the pigment is added after such flocculation.

Example 1

A quantity of 2750 grams of latex preserved with potassium hydroxide and containing 40% rubber was diluted with water to 5 liters. Five hundred grams of gas black were dispersed in 4½ liters of water containing, as a dispersing agent, 20 grams of "Vultamol," which is a sodium salt of a thio acid, and this dispersion was added to the latex and thoroughly mixed therewith. The compounded latex was then added to 6 liters of a solution containing 100 grams of 34% aluminum chloride and a flocculated rubber containing carbon black resulted. On filtration the rubber flocs formed a coherent filter cake which could not be broken up into a powder because of the rubbery nature of the cake.

Example 2

A quantity of 2750 grams of latex preserved with potassium hydroxide and containing 40% rubber was diluted to 5 liters and added to 6 liters of a solution containing 100 grams of 34% aluminum chloride. Five hundred grams of gas black were dispersed in 4½ liters of water containing 20 grams of "Vultamol," and this dispersion was then added to the flocculated latex and thoroughly mixed therewith. On filtration, a cake of rubber flocs containing carbon black was obtained, which cake was readily crumbled to form a discrete rubber powder which, even when dried, was non-coherent and could be readily handled.

These two examples, carried out under strictly comparable conditions, show that the addition of the properly dispersed carbon black to a previously flocculated latex results in a crumbly cake readily reducible to rubber powder whereas addition of the carbon black to an unflocculated latex which is then flocculated in the presence of the carbon black results in a coherent rubbery cake, which cannot be broken up into a powder.

The dried coherent cake from Example 1 and the dried non-coherent powder from Example 2 were each milled just enough to give a smooth sheet. A sample of each sheet was examined microscopically and the dispersion of the black in the rubber was found to be good in both cases. A further check on the quality of the dispersion was made by milling into a sample of each the necessary curing ingredients to give a compound suitable for tire treads. A control stock was made by milling into smoked sheet quantities of carbon black and the other compounding ingredients to give exactly the same formula as for the stocks obtained from latex by the procedures of Examples 1 and 2. All three stocks were then cured and tested for abrasion resistance by the well known Grasselli abrasion test (J. I. E. C. 19, 674). The results measured in cc. loss per H. P. hour showed uniform quality for the three samples.

Thus, by the practice of the invention, rubber containing carbon black can be obtained in finely divided form suitable for further mixing and processing into tire treads and other useful rubber articles without the disadvantages of the processes of the prior art.

Instead of the potassium hydroxide preserved latex of the examples, other forms of latex may be employed, such as, for example, latex preserved with ammonia, sodium hydroxide, formaldehyde, etc. Also, other concentrations of latex, flocculating agents, and other varieties of carbon black than those employed in the foregoing examples may be used. Representative of the other flocculating agents well known to the art which may be employed are the chlorides, sulfates and acetates of aluminum, zinc, magnesium, calcium, lead, etc. and other acidic salts having a flocculating action on latex. The carbon black may be any of the finely divided carbons known and used in the rubber art, such as lampblack, gas black, "Thermatomic" black, "Superspectra," etc. While the process is generally applicable in the preparation of powdered rubber containing carbon black, it has, as has been previously pointed out, special application in cases in which the carbon black is present in relatively large amounts, i. e., at least twenty parts of carbon black per one hundred parts of rubber.

Thus, while only certain preferred forms of the invention have been described in detail, it will be apparent to those skilled in the art that various modifications may be made therein without departing from the spirit of the invention or from the scope of the appended claims. It is intended that the patent shall cover, by suitable expression in the appended claims, all features of patentable novelty residing in the invention.

What I claim is:

1. A process of preparing powdered or granular rubber associated with carbon black which comprises adding an acidic salt to latex to produce a slurry of flocculated rubber, then adding a dispersion of carbon black to the slurry of flocculated rubber in the ratio of at least twenty parts of carbon black per hundred parts of rubber, dewatering the compounded slurry to form a crumbly cake, reducing this cake to powder and finally drying the compounded rubber powder.

2. A process of preparing powdered or granular rubber associated with carbon black which comprises adding an acidic salt to latex in the absence of added hydrophilic colloid to produce a slurry of flocculated rubber, then adding a dispersion of carbon black to the slurry of flocculated rubber in the ratio of at least twenty parts of carbon black per hundred parts of rubber, dewatering the compounded slurry to form a crumbly cake, reducing this cake to powder and finally drying the compounded rubber powder.

3. A process of incorporating carbon black into rubber which comprises adding an acidic salt to latex to produce a slurry of flocculated rubber, then adding a dispersion of carbon black to the slurry of flocculated rubber in the ratio of at least twenty parts of carbon black per hundred parts of rubber, dewatering the compounded slurry to form a crumbly cake, reducing this cake to powder, finally drying the compounded rubber powder and mechanically working the powder to consolidate and homogenize the same.

4. Powdered rubber composed of rubber flocs having associated with the exterior of said flocs carbon black in the ratio of at least twenty parts of carbon black per hundred parts of rubber and being free from added hydrophilic colloid, said powdered rubber being prepared by adding an acidic salt to latex in the absence of added hydrophilic colloid to produce a slurry of flocculated rubber, then adding a dispersion of carbon black to the slurry of flocculated rubber in the ratio of at least twenty parts of carbon black per hundred parts of rubber, dewatering the compounded slurry to form a crumbly cake, reducing this cake to powder and finally drying the compounded rubber powder.

JAMES A. MERRILL.